(12) United States Patent
Hähnel

(10) Patent No.: US 10,815,394 B2
(45) Date of Patent: Oct. 27, 2020

(54) METHOD FOR PRODUCING AN ADHESIVE TAPE BY MEANS OF PLASMA LAMINATION

(71) Applicant: TESA SE, Norderstedt (DE)

(72) Inventor: Marcel Hähnel, Klein Nordende (DE)

(73) Assignee: TESA SE, Norderstedt (DE)

( * ) Notice: Subject to any disclaimer, the term of this patent is extended or adjusted under 35 U.S.C. 154(b) by 165 days.

(21) Appl. No.: 16/073,071

(22) PCT Filed: Feb. 16, 2017

(86) PCT No.: PCT/EP2017/053504
§ 371 (c)(1),
(2) Date: Jul. 26, 2018

(87) PCT Pub. No.: WO2017/140782
PCT Pub. Date: Aug. 24, 2017

(65) Prior Publication Data
US 2019/0048230 A1 Feb. 14, 2019

(30) Foreign Application Priority Data
Feb. 17, 2016 (DE) .................. 10 2016 202 424

(51) Int. Cl.
C09J 5/02 (2006.01)
B29C 70/54 (2006.01)
B29C 70/00 (2006.01)

(52) U.S. Cl.
CPC .................. C09J 5/02 (2013.01); B29C 70/00 (2013.01); B29C 70/543 (2013.01);
(Continued)

(58) Field of Classification Search
CPC ........... B29C 70/00; B29C 70/543; C09J 5/02
See application file for complete search history.

(56) References Cited

U.S. PATENT DOCUMENTS 9,550,920 B2   1/2017  Koops et al.
2004/0231591 A1* 11/2004 Jacobsen ................ B29C 59/14
                                                        118/718
(Continued)

FOREIGN PATENT DOCUMENTS

CN    103421200 A    12/2013
DE    2460432 A1      6/1976
(Continued)

OTHER PUBLICATIONS

Machine Translation DE-4127723-A1 (Year: 1993).*
(Continued)

Primary Examiner — Daniel McNally
(74) Attorney, Agent, or Firm — Norris McLaughlin, P.A.

(57) ABSTRACT

Methods produce an adhesive tape, in which a fluoropolymer web and a cross-linked silicon-adhesive-mass web are supplied to a lamination gap in the same supply direction, and the cross-linked silicon-adhesive-mass web and the fluoropolymer web are laminated together with a respective first surface. The first surface of the fluoropolymer web and the first surface of the cross-linked silicon-adhesive-mass web are activated by a plasma, wherein the plasma continuously acts on the two first surfaces under atmospheric pressure, starting before the lamination gap until entering the lamination gap, and the two activated first surfaces are pressed onto one another in the lamination gap.

16 Claims, 2 Drawing Sheets

Figure 1:
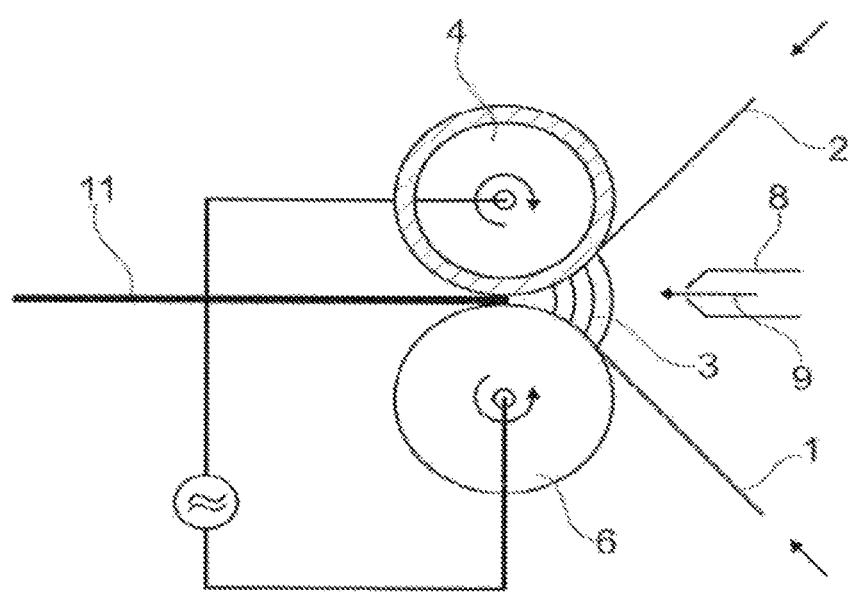

(52) U.S. Cl.
CPC .... *C09J 2301/416* (2020.08); *C09J 2427/006* (2013.01); *C09J 2483/00* (2013.01)

(56) References Cited

U.S. PATENT DOCUMENTS

| | | | |
|---|---|---|---|
| 2008/0199636 A1 | 8/2008 | Husemann et al. | |
| 2009/0012218 A1* | 1/2009 | Kuroda | C08K 3/24 524/165 |
| 2010/0206474 A1* | 8/2010 | Sato | C08J 5/124 156/273.3 |
| 2013/0280539 A1* | 10/2013 | Wilken | H01J 37/32825 428/429 |
| 2013/0337234 A1 | 12/2013 | Shim et al. | |
| 2014/0127501 A1* | 5/2014 | Schumann | C08G 18/6674 428/349 |
| 2014/0154944 A1 | 6/2014 | Koops et al. | |
| 2016/0158971 A1* | 6/2016 | Bernt | B29C 33/58 264/511 |
| 2017/0282445 A1 | 10/2017 | Koops et al. | |
| 2017/0283657 A1 | 10/2017 | Hähnel | |

FOREIGN PATENT DOCUMENTS

| | | | | |
|---|---|---|---|---|
| DE | 2754425 | A1 | 6/1979 | |
| DE | 4127723 | A1 * | 2/1993 | ............ B29C 59/12 |
| DE | 4127723 | A1 | 2/1993 | |
| DE | 19802662 | A1 | 7/1999 | |
| DE | 19846814 | A1 | 4/2000 | |
| DE | 10347025 | A1 | 7/2005 | |
| DE | 102005027391 | A1 | 12/2006 | |
| DE | 102007063021 | A1 | 6/2009 | |
| DE | 102011075470 | A1 | 11/2012 | |
| DE | 102013221847 | A1 * | 2/2015 | ............ B29C 70/48 |
| WO | 2015/014646 | A1 | 2/2015 | |
| WO | 2016/034569 | A1 | 3/2016 | |
| WO | 2016/034738 | A1 | 3/2016 | |

OTHER PUBLICATIONS

International Search Report dated May 11, 2017, dated May 24, 2017.

English Translation of International Search Report dated May 11, 2017, dated May 24, 2017.

* cited by examiner

METHOD FOR PRODUCING AN ADHESIVE TAPE BY MEANS OF PLASMA LAMINATION

This application is a 371 application of PCT/EP2017/053504 filed Feb. 16, 2017, which claims foreign priority benefit under 35 USC 119 of German application 10 2016 202 424.8 filed Feb. 17, 2016.

The invention relates to a method for producing an adhesive tape according to the generic portion of claim 1.

The adhesive tape according to the invention is intended in particular to be suitable for lining molds in composite construction, e.g. molds used in lamination methods for fiber composite materials. In this case, the inner surfaces of the molds are completely masked with the adhesive tape. The adhesive tape composed of a carrier film and an adhesive substance layer should show favorable antiadhesive properties with respect to the fiber composite material so that the cured laminate can be easily removed from the mold and the mold masked with the adhesive tape can then immediately be used in a further production cycle.

A method is known from WO 2015/014646 for molding a body in a mold in which an adhesive tape is applied to an inner surface of a mold, laminate layers on the inner surface of the mold are applied to the adhesive tape, the laminate layers are infused with an epoxy resin and cured, and the laminated component can easily be detached from the adhesive tape after curing. For this purpose, a carrier film of the adhesive tape comprises fluoropolymers. Fluoropolymers are generally known for their favorable antiadhesive properties. An adhesive substance layer is applied to the carrier film. In this case, the layer may be a silicone adhesive substance layer. The adhesive substances are directly applied to the carrier film and then crosslinked by means of thermal treatment or UV light irradiation. The adhesive tape can then be rolled up and later provided for its intended use. Disadvantageously, it has been found that the separating forces between the silicone adhesive substance and the fluoropolymer film are not sufficiently strong, as the fluoropolymer film also exerts its favorable antiadhesive properties with respect to the silicone adhesive substance, and the adhesive tape may therefore be destroyed after the laminate component is removed from the mold.

CN 103421200 discloses a method by which the separating forces between the fluoropolymer film and an adhesive substance layer can be increased, wherein the fluoropolymer film is treated exclusively in the form of PTFE by means of organic solvents in an ultrasound bath. For this purpose, the PTFE film is washed in methanol/ethanol/isopropanol/acetone or in toluene. The purified surface is subjected to plasma treatment. The plasma used in CN 103421200 is produced only in highly pure noble gases and under extremely narrow physical parameters, such as current, density, and voltage. This plasma process cannot be implemented on an industrial basis, and the limiting factors are described in detail in CN 103421200:

Process gas: argon at 10-25 l/min
Voltage: 9-12 kV @ 10-20 kHz
Current density: 0.5-2 mA/cm$^2$
Oxygen content: 0.01-2%
Duration of plasma treatment: 15-60 s The method according to CN 103421200 is not suitable for activation of substances other than PTFE, because impurities such as "weak layers" cannot be removed and therefore adversely affect the adhesive bond with the adhesive substance.

The object of the invention is therefore to provide an improved method for producing an adhesive tape.

The object is achieved by means of the above-mentioned method with the features of claim 1.

Preferred improvements of the invention are the subject matter of the dependent claims.

The invention uses the idea of gluing the silicone adhesive substance directly to the fluoropolymer web, thus combining the favorable antiadhesive properties of the fluoropolymer web with the favorable adhesive properties of the silicone adhesive substance web.

After joining of the silicone adhesive substance web and the fluoropolymer web, the resulting adhesive type has a pure fluoropolymer surface on one side, while it has a pure silicone adhesive substance surface on the opposite side. The adhesive tape can be firmly glued with its silicone adhesive substance surface to the surfaces of parts to be joined, in particular also to the surfaces of molds for the production of fiber composite materials. After completion of the fiber composite material in the mold, the adhesive tape allows easy release of the fiber composite material from the fluoropolymer surface, which has a weaker adhesive force.

According to the invention, the adhesive bond between the silicone adhesive substance web and the fluoropolymer web is first achieved according to a preferred variant of the invention because the silicone adhesive substance is already crosslinked and can be provided in web form, the crosslinked silicone adhesive substance web and the fluoropolymer web can be supplied to a lamination gap in the same supply direction, and the crosslinked silicone web and the fluoropolymer web are each laminated together with a respective first surface, wherein the first surface of the fluoropolymer web and the first surface of the crosslinked silicone adhesive substance web are activated by a plasma, wherein the plasma continuously acts on the two first surfaces under atmospheric pressure, starting before the lamination gap and continuing into the lamination gap, and the two activated first surfaces are pressed onto one another in the lamination gap.

However, crosslinking of the silicone substance can also be carried out after lamination.

According to the invention, this pretreatment of the two first surfaces is carried out by means of plasma treatment. Plasma is also referred to as the fourth aggregate state of matter. It is a partially or completely ionized gas. As a result of the energy supplied, positive and negative ions, electrons, other aggregate states, electromagnetic radiation, and chemical reaction products are produced. Many of these species can lead to changes in the surface to be treated, here the surface of the fluoropolymer web and the silicone adhesive substance web. In summary, the treatment leads to activation of the first surface of the fluoropolymer web and the first silicone adhesive substance surface, specifically to higher reactivity of the two first surfaces. The treatment is used according to the invention in order to increase the separating force between the fluoropolymer film surface and the silicone adhesive substance layer.

For example, plasma and corona pretreatments have been previously described or mentioned in DE 2005027391 A1 and DE 10347025 A1.

DE 102007063021 A1 describes the activation of adhesive substances by means of a filamentous corona treatment. It is disclosed that the prior plasma/corona pretreatment has a positive effect on the shear life and flow behavior of the adhesive bond. It was not found that the method can produce an increase in adhesive strength.

Similarly to DE 102007063 021 A1, DE 102011075470 A1 describes the physical pretreatment of an adhesive substance and a carrier/substrate. The pretreatments are carried out separately prior to the joining step and can be configured to be either the same or different. This two-sided pretreatment allows greater adhesive and anchoring forces to be achieved than in substrate-side pretreatment.

In DE 2460432 A, two webs are joined to produce a laminate by bringing in an artificial plastic film that serves as a bonding agent. The plasma is formed between the two laminating rollers, which are grounded, and a high-voltage electrode, which also comprises a breakthrough for the bonding agent. The air flowing around the rollers is intended to be affected by the plasma such that the bonding agent does not cool prematurely and no air enclosures are produced in the laminate.

In DE 2754425 A, reference is made to DE 2460432 A. New arrangements for the same object are described. In this case, according to FIG. 1, the plasma is formed between the two lamination rollers, one of which is dielectrically coated. As is the case in DE 2460432 A, only lamination of flat film webs by means of a thermoplastic plastic melt is described.

In DE 19846814 A1, various arrangements are described which, according to the object, are designed for improved plasma treatment of the webs before they are laminated together. Webs are only spoken of in general, and the term "films" is mentioned only in connection with DE 19802662 A1. Adhesive substances are not mentioned.

In this case as well, the plasma is formed between two laminating rollers. The dielectric is formed by at least one concomitantly running tape.

DE 4127723 A1 describes the production of multilayer laminates of plastic film webs and plastic plates in which at least one of the surfaces to be joined is treated immediately before the joining step with an aerosol corona. According to FIG. 1, this flow-driven plasma can also be guided directly into the lamination gap. Monomers, dispersions, colloidal systems, emulsions or solutions are suitable for use as an aerosol.

The invention combines two contradictory requirements placed on the adhesive tape. The adhesive tape must show highly favorable antiadhesive properties on one of its outer surfaces, but highly favorable adhesive properties on its other outer surface. The adhesive tape according to the invention is produced from a fluoropolymer web and a silicone adhesive substance web that are plasma-laminated together with their two first surfaces. The second surface of the fluoropolymer web opposite the first surface forms the one outer surface of the adhesive tape, and the second surface of the silicone adhesive substance web opposite the first surface forms the other outer surface of the adhesive tape.

On the one hand, the fluoropolymer web is used as the one outer surface of the adhesive tape so that fiber composite materials adhering to it can be easily detached from the adhesive tape by means of a vacuum infusion process or a similar process carried out in a mold. On the other hand, the other outer surface, which is formed by the silicone adhesive substance web, adheres quite favorably to the mold.

These requirements, which are contradictory per se, lead to problems at the contact surface between the silicone adhesive substance web and the fluoropolymer web. The invention solves this problem of contradictory requirements in that the first surface of the fluoropolymer film and the first surface of the silicone adhesive substance are subjected to plasma treatment before being laminated onto each other.

In contrast, the prior art is characterized in that pretreatments pertain primarily to the carrier material or the part to be joined, i.e. the surface to be glued, in order to build up greater anchoring force with respect to the adhesive or the self-adhesive tape.

It is true that the anchoring forces are clearly increased by corresponding plasma/corona treatments compared to untreated members to be joined, but in the many systems that do not undergo cohesive failure, one reaches a certain limit that cannot be overcome with the corona and plasma systems of prior art.

As was noted in the context of the present invention, the reason for this lies in the nature of the adhesive substances and their interaction with the substrate. In this case, an interaction takes place chiefly via functional groups having different dipole actions. These functional groups are formed on the surfaces by plasma treatment and are of multifaceted and differing types. They are essentially formed after termination of the contact between the plasma and the surface by reactions with atmospheric oxygen. These groups can be controlled in part and within narrow limits by means of the process gases and process modes used. Accordingly, a significant increase is possible only if covalent bonds can be formed between the members to be joined.

This raises the question of whether it is possible, by means of a suitable process, to produce these covalent bonds without having their radicals first react with gaseous components on the surfaces to be treated.

The object of the invention is to identify the above-mentioned positive effects of physical surface modification of adhesive substances and carrier materials in order to achieve high-strength compounds. The core of this object is the achievement of stronger anchoring between the adhesive layer and the carrier material.

The invention advantageusly relates to a method for increasing the separating force between the first surface of a silicone adhesive substance web and the first surface of the fluoropolymer web using a lamination gap, wherein the lamination gap is formed by a pressure roller and a counterpressure roller that exerts a counterpressure, and the two first surfaces are pressed against each other between the pressure roller and the counterpressure roller.

By use of the rollers, continuous lamination is favorably achieved, thus providing a continuously running process.

At least one or both of the circumferential surfaces of the rollers is equipped with a dielectric. The dielectric allows a strong alternating voltage to be produced between the two electrically conductive rollers, which are preferably composed of metal. The alternating field produced between the rollers generates the plasma.

It is essential to the invention that the plasma extends to a line at which the two materials in web form are laminated together.

In the context of the invention, a clear distinction is made between corona and plasma treatment. When plasma treatment is mentioned in the following, this actually refers only to such treatment.

In this case, the silicone adhesive substance web and the fluoropolymer web run in the same web direction into the lamination gap.

As the plasma is formed in the lamination gap, the silicone adhesive substance web and the fluoropolymer web are laminated together in the plasma with their respective first surfaces.

According to a first preferred embodiment of the invention, an arbitrary point on the surface of the silicone adhesive substance web and/or the fluoropolymer web treated with plasma traverses the path from the beginning of plasma treatment to the lamination gap in a time period of less than 2.0 s, preferably less than 1.0 s, and more preferably less than 0.5 s. Periods of less than 0.5 s, preferably less than 0.3 s, and more preferably less than 0.1 s are also possible according to the invention.

The lamination gap is formed by a pressure roller and a counterpressure roller, which exerts the counterpressure desired for lamination. The rollers preferably rotate in opposite directions, and more preferably at exactly the same circumferential speed.

In the lamination gap, the circumferential speed and the direction of rotation of the rollers are identical to the web speed and web direction of the first and the second material in web form. More preferably, optionally present further webs also show identical web speed and web direction.

The rollers preferably have the same diameter, and more preferably, the diameter is between 50 to 500 mm. Advantageously, the circumferential surface of the rollers is smooth, and in particular polished.

The surface roughness ("Ra") of the rollers is preferably less than 50 μm, and preferably less than 10 μm. "Ra," an industrial standard for the quality of the final surface treatment, is the average height of roughness, in particular the average absolute distance from the center line of the roughness profile within the evaluation range.

The surface of the roller not coated with a dielectric can be composed of steel, stainless steel or chrome-plated steel. The surface can also be nickel- or gold-plated. It should only be electrically conductive and remain conductive under the effect of plasma. The surface should show no corrosion or plasma effects.

Furthermore, it is possible to cool or heat the two rollers with oil, water, steam, electricity or other temperature media in a preferred range of −40° C. to 200° C. The two rollers are preferably unheated.

For the layer of the dielectric that coats the entire circumferential surface (also referred to simply as the surface) of one or both rollers, i.e. the entire circumference of the roller(s), the substances selected are preferably ceramics, glass, plastics, or rubbers such as styrene-butadiene rubbers, chloroprene rubbers, butadiene rubbers (BR), acrylonitrile-butadiene rubbers (NBR), butyl rubbers (IIR), ethylene-propylene-diene rubbers (EPDM) and polyisoprene rubbers (IR) or silicone.

The dielectric firmly encloses the roller(s), but can also be detachable, for example in the form of two half-shells or an elastic tube.

The thickness of the layer of the dielectric on the roller or rollers is preferably between 1 and 5 mm.

According to the invention, it is provided that the dielectric is not a concomitantly running web that only partially covers the circumferential surface of one of the rollers (or two concomitantly running webs that only partially cover the circumferential surfaces of the both rollers).

According to a preferred variant, only one of the pair of rollers forming the lamination gap is coated with a dielectric.

According to a preferred variant, both of the pair of rollers forming the lamination gap are coated with a dielectric.

Preferably, the plasma is produced between one or a plurality of nozzles and the rollers, preferably in operation with compressed air or nitrogen.

The plasma treatment is carried out at a pressure that is close to ±0.05 bar or at atmospheric pressure.

The plasma treatment can be carried out in various atmospheres, wherein the atmosphere may also comprise air. The treatment atmosphere can be a mixture of various gases, selected for example from $N_2$, $O_2$, $H_2$, $CO_2$, Ar, He, and ammonia, with it also being possible to mix in water vapor or other components such as hydrocarbons. This list, given by way of example, is by no means limitative.

According to an advantageous embodiment of the invention, the following pure or mixed process gases form the treatment atmosphere: $N_2$, compressed air, $O_2$, $H_2$, $CO_2$, Ar, He, ammonia, ethylene, siloxanes, acrylic acids, and/or solvents, with it also being possible to mix in water vapor or other volatile components. $N_2$ and compressed air are preferred.

The atmospheric pressure plasma can be formed with a mixture of process gases, wherein the mixture preferably contains 90 vol % nitrogen and at least one noble gas, preferably argon.

According to a preferred embodiment of the invention, the mixture is composed of nitrogen and at least one noble gas, with the mixture more preferably being composed of nitrogen and argon.

As a rule, coating or polymerizing components can also be mixed with the atmosphere as gases (such as ethylene) or fluids (vaporized or atomized as an aerosol). There are virtually no limitations on suitable aerosols. The indirectly-acting plasma techniques are particularly well-suited for the use of aerosols, as there is no risk of contamination of the electrodes in this case. However, the content thereof should not exceed 5 vol %.

As a rule, all of the above-mentioned nozzle types are suitable for producing the plasma and acting on the materials in web form, provided that the plasma acts continuously until the lamination gap is entered.

A possible variant of the plasma treatment is use of a stationary plasma jet.

Another possible plasma treatment uses an arrangement of multiple nozzles, if necessary offset, for gapless, partially overlapping treatment of sufficient width. In this case, either rotating or not-rotating round nozzles may be used.

Linear electrodes with a gas discharge opening, which advantageously extend over the entire length of the lamination gap, are particularly suitable.

More preferably, these show a constant distance from the lamination gap over the entire length of said gap.

According to a further variant, the plasma burns between the edge of a metal plate, a metal rod, or a metal wire and the dielectrically coated roller or rollers.

In this case as well, the edge of the plate, rod, or wire should be oriented parallel to the lamination gap.

More preferably, the plasma generator is covered with an insulator up to the outer edge facing toward the lamination gap.

According to a further advantageous embodiment of the invention, the treatment distance of the plasma generator from the lamination gap is 1 to 100 mm, preferably 3 to 50 mm, and particularly preferably 4 to 20 mm.

Preferably, the plasma generator can be displaced upward perpendicularly to the plane that is in turn perpendicular to the plane spanned by the roller axes, preferably simultaneously upward and at a distance from the lamination gap.

The speed at which the webs are guided into the lamination gap is preferably between 0.5 and 200 m/min, preferably 1 to 50 m/min, and particularly preferably 2 to 20 m/min (respective ranges are inclusive of boundary values).

Particularly preferably, a web is used as the fluoropolymer web that comprises one or at least two fluoropolymers.

Fluoropolymers or fluorinated polymers are understood in the context of this invention, and in general, as referring both to fluorinated polymers composed exclusively of carbon atoms and to those with heteroatoms in the main chain.

Representatives of the former group are homo- and copolymers of olefinically unsaturated fluorinated monomers.

The fluoropolymers produced from these monomers are divided into the categories of polytetrafluoroethylene, fluorothermoplastics, fluororubbers and the fluoroelastomers obtained therefrom by vulcanization. The most important representatives of fluoropolymers with heteroatoms in the main chain are the polyfluorosiloxanes and polyfluoroalkoxyphosphazenes.

Preferably, the fluoropolymer web comprises one or at least two fluoropolymers to 50 wt %, more preferably 75 wt %, particularly preferably 90 wt %, and most particularly preferably 95 wt % (based in each case on the total composition of the fluoropolymer web).

More preferably, the polymers forming the fluoropolymer web are composed to 100 wt % of one or at least two fluoropolymers. The fluoropolymers can also optionally be added to the additives described below. The latter—as mentioned—are not absolutely required, and need not be used.

In particular, PTFE (polytetrafluoroethylene), ETFE (poly(ethylene-co-tetrafluoroethylene)), FEP (poly(tetrafluoroethylene-co-hexafluoropropylene)), PVDF (poly(1,1-difluoroethene) or PFA (perfluoroalkoxy polymers) are suitable as fluoropolymers, or mixtures of two or more of the abovementioned fluoropolymers.

PTFE refers to fluoropolymers that are composed of tetrafluoroethene monomers.

ETFE is a fluorinated copolymer composed of the monomers chlorotrifluoroethylene, or also tetrafluoroethylene and ethylene.

FEP, also called fluorinated ethylene-propylene copolymer, refers to copolymers of tetrafluoroethene and hexafluoropropene.

PVF is a polymer produced from vinyl fluoride (polyvinyl fluoride).

PCTFE is a polymer composed of chlorotrifluoroethylene (polychlorotrifluoroethylene).

ECTFE is a copolymer composed of ethylene and chlorotrifluoroethylene.

PVDF refers to fluoropolymers producible from 1,1-difluoroethene (vinylidene fluoride).

PFA refers to copolymers with groupings such as

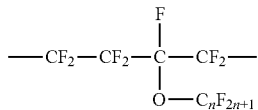

as basic units [poly(tetrafluoroethylene-co-perfluoroalkyl vinyl ether)]. PFAs result from the copolymerization of tetrafluoroethene and perfluoroalkoxy vinyl ethers (such as perfluorovinyl propyl ether, n=3).

The fluoropolymers can be mixed with further polymers, wherein the fluoropolymers must show good miscibility with the other polymers.

Suitable polymers are olefinic polymers such as homo- or copolymers of olefins such as ethylene, propylene or butylene (here, the term copolymer is to be understood analogously as including terpolymers), polypropylene homopolymers or polypropylene copolymers, including the block (impact) and random polymers.

Further polymers, used alone or in a mixture, can be selected from the group of the polyesters, such as in particular polyethylene terephthalate (PET), polyamide, polyurethane, polyoxymethylene, polyvinylchloride (PVC), polyethylene naphthalate (PEN), ethylene vinyl alcohol (EVOH), polyvinylidene chloride (PVDC), polyvinylidene fluoride (PVDF), polyacrylonitrile (PAN), polycarbonate (PC), polyamide (PA), sulfone (PES), polyimide (PI), polyarylene sulfide and/or polyarylene oxide.

The polymers for forming the fluoropolymer web can be present in pure form or in blends with additives such as antioxidants, light stabilizers, antiblocking agents, lubrication and processing aids, fillers, dyes, pigments, and blowing or nucleating agents.

Preferably, the film comprises none of the aforementioned additives, with the exception of dyes. Dyes are preferably used, but need not necessarily be present.

The silicone adhesive substance web can be a one-, two-, or multicomponent adhesive system. The silicone adhesive substance can first be applied to a peel film comprising PE or PET or be composed thereof, which imparts to it stability during the production process of the silicone adhesive substance web. Application of the silicone adhesive substance to the peel film can be carried out using spray nozzles followed by a spreading bar, which produces a silicone adhesive substance layer of constant thickness over the entire peel film.

The silicone adhesive substance layer is then crosslinked, with crosslinking preferably being carried out by heating to temperatures of up to 300° C., but preferably less than 200° C. The silicone adhesive layer can be dried before or after this. After crosslinking of the silicone adhesive substance, a permanently tacky silicone adhesive substance layer is produced. The first surface of the silicone adhesive substance web and the first surface of the fluoropolymer web are activated in the above-described plasma method and laminated onto each other during activation. This causes the formation on both of the first surfaces of both radicals and functional groups, which, however, do not have enough time to react with the ambient air or molecules of the process gas, but are directly laminated onto each other. Therefore, the radicals of the two first surfaces also react directly when they are laminated onto each other, with the result that covalent bonds between the two first surfaces can be produced that produce particularly high bonding strength.

Figure 2:
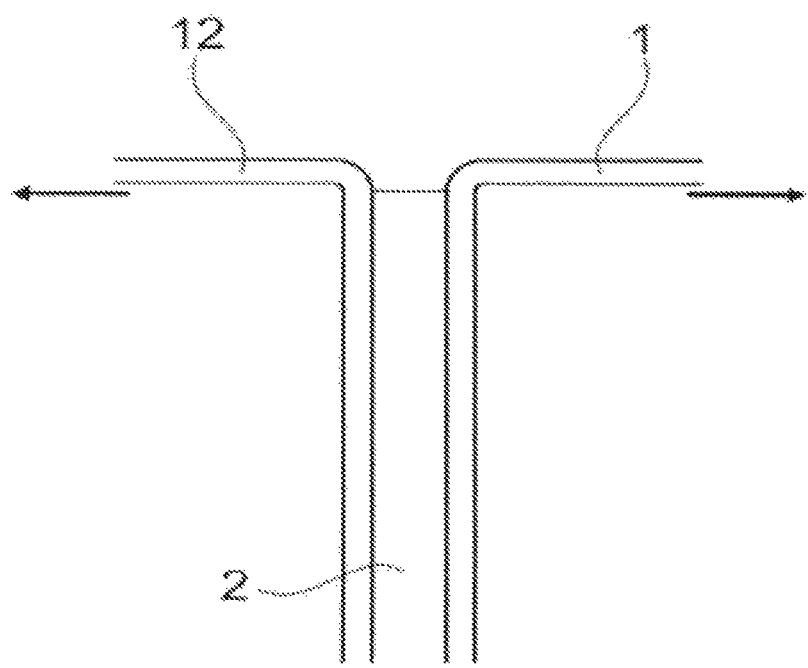

The invention will be described by means of an example with two figures. The figures are as follows:

FIG. 1 is a schematic view of the structure of the lamination gap for carrying out the method according to the invention, FIG. 2 is a schematic diagram of the T peel test.

As the first starting web, an ETFE film was used as a fluoropolymer web 1, which was provided in web form with a width, a constant thickness, and an indeterminate length. As a second starting web, a thermally crosslinked silicone adhesive substance from Marke Dow Corning 7657 with Syl-Off 4000 in a thickness of 50 g/m² was provided. The thermally crosslinked silicone adhesive substance is also in web form as a silicone adhesive web 2, with a width that is adapted to the width of the ETFE web and preferably corresponds thereto; the length of the silicone adhesive web is also indeterminate.

FIG. 1 shows a lamination gap 3 formed by a pressure roller 4 and a counterpressure roller 6, which builds up the counterpressure desired for lamination. The rollers 4, 6, which are identical in diameter and in their longitudinal extension, run in opposite directions at an identical circumferential speed. A layer of a dielectric 7 is applied to the pressure roller 4 that completely encloses the pressure roller 4 and is applied to the entire outer surface of the pressure roller 4 along the entire longitudinal extent of the pressure roller 4. The layer thickness of the dielectric is preferably between 1 and 5 mm. The dielectric is advantageously composed of ceramics, glass, plastics, or rubber such as styrene-butadiene rubbers, chloroprene rubbers, butadiene rubbers, acrylonitrile-butadiene rubbers, butyl rubbers, ethylene-propylene-diene rubbers (EPDM) or polyisoprene rubbers (IR).

A high-frequency alternating voltage (16 kV, 14 kV) that generates a plasma in the lamination gap 3 is applied between the pressure roller 4 and the counterpressure roller 6. A process gas 9 is supplied to the lamination gap 3 via a process gas nozzle 8; in various tests, air, nitrogen, or carbon dioxide was used as a process gas 9, but other process gases or mixtures of these process gases are also conceivable.

The plasma treatment is carried out at a pressure close to atmospheric pressure, i.e. at atmospheric pressure ±0.05 bar, or at atmospheric pressure.

The silicone adhesive substance web 2 and the fluoropolymer web 1 are continuously supplied in the same web direction to the lamination gap 3. The web speeds are 0.5 to 200 m/min, preferably between 1 and 50 m/min, and particularly preferably between 2 and 20 m/min.

In the lamination gap 3, a first surface of the fluoropolymer web 1 and a first surface of the silicone adhesive substance web 2 are laminated together, i.e. pressed together such that a laminate is produced that forms an adhesive tape 11. The two first surfaces are arranged relative to each other such that on lamination, they are pressed in direct contact with each other or under pressure against each other. Before they are laminated together, the two first surfaces are plasma-treated over their entire surface in such a manner that the plasma continuously acts on the two first surfaces beginning before the lamination gap 3 and until the lamination gap 3 is entered.

The plasma lamination is thus carried out immediately before and in the lamination gap 3 according to FIG. 1. In the tests conducted, the laminate was stored at 40° C. for three days after plasma lamination, and the separating forces generated were determined by means of a T peel test.

The separating forces generated in the lamination process shown between the silicone adhesive substance web 2 and the fluoropolymer web 1 were determined in the T peel test according to FIG. 2.

In this case, if applicable after being pulled off an optionally present separating film (not shown), the silicone adhesive substance web 2 is glued onto a chemically etched PET film 12, the PET film 12 and the fluoropolymer film 1 are then pulled apart in opposite directions at an angle of 180°, and the force required for this is measured.

Table 1 shows the results obtained.

TABLE 1

| Test | T peel [N/cm] |
|---|---|
| ETFE pretreated in air, lamination with crosslinked substance | 3.15 |
| ETFE pretreated in nitrogen, lamination with crosslinked substance | 3.89 |
| ETFE pretreated in carbon dioxide, lamination with crosslinked substance | 3.49 |
| ETFE pretreated in air, lamination with uncrosslinked substance followed by thermal crosslinking | 7.27 |

TABLE 1-continued

| Test | T peel [N/cm] |
|---|---|
| ETFE pretreated in nitrogen, lamination with uncrosslinked substance followed by thermal crosslinking | 7.17 |
| ETFE pretreated in carbon dioxide, lamination with uncrosslinked substance followed by thermal crosslinking | 7.25 |
| ETFE and crosslinked substance pretreated in air, lamination | 6.98 |
| Plasma lamination of ETFE and crosslinked substance | 7.63 |

In the first three tests (the first three cells in Table 1 read from top to bottom), the fluoropolymer film 1 was subjected to corona pretreatment with air, nitrogen or carbon dioxide as a process gas 9 and then laminated with an already thermally crosslinked silicone adhesive substance web 2. The separating forces determined in the T peel test were 3.15 N/cm, 3.89 N/cm and 3.49 N/cm; in all three cases, only the fluoropolymer web 1 was subjected to corona pretreatment.

In the fourth, fifth, and sixth test, the fluoropolymer web 1 was also pretreated in a corona process, wherein air, nitrogen or carbon dioxide were again used as process gases. After this, uncrosslinked silicone adhesive substance was applied to the pretreated first surface of the fluoropolymer web 1 and only then thermally crosslinked. The separating forces were significantly higher than in the first three tests at 7.27 N/cm, 7.17 N/cm and 7.25 N/cm depending on the process gas used.

In the seventh test, the fluoropolymer web 1 and the crosslinked silicone adhesive substance web 2 were pretreated with a process gas composed of air. Lamination of the two first surfaces of the two webs 1, 2 was then carried out. Separating forces of 6.98 N/cm were generated.

In the plasma lamination method according to the invention, in which plasma treatment of both the first surface of the fluoropolymer web 1 and the first surface of the already-crosslinked silicone adhesive substance web 2 was carried out and lamination was carried out simultaneously with or shortly after the plasma treatment, the highest measured separating forces of 7.63 N/cm were generated.

The plasma lamination method according to the invention also shows a significant increase in separating forces in the case of an uncrosslinked silicone adhesive substance web.

LIST OF REFERENCE NOS

1 Fluoropolymer web
2 Silicone adhesive substance web
3 Lamination gap
4 Pressure roller
6 Counterpressure roller
7 Dielectric
8 Process gas nozzle
9 Process gas
11 Adhesive tape
12 PE or PET film

The invention claimed is:

1. A method for producing an adhesive tape, the method comprising:
   supplying a fluoropolymer web and a crosslinked silicone adhesive substance web to a lamination gap in the same supply direction such that a first surface of the crosslinked silicone adhesive substance web and a first surface of the fluoropolymer web are laminated together;
   plasma treating the first surface of the fluoropolymer web and the first surface of the crosslinked silicone adhesive substance web with a plasma to activate the two first surfaces, wherein plasma treatment continuously acts on the two first surfaces, under atmospheric pressure, starting before the lamination gap until the lamination gap is entered; and pressing the activated two first surfaces onto one another in the lamination gap, wherein the crosslinked silicone adhesive substance web comprises a permanently tacky silicone adhesive substance layer and has a layer thickness of less than 300 µm.

2. The method according to claim 1, wherein the lamination gap is formed by a pressure roller and a counterpressure roller.

3. The method according to claim 2, wherein one surface of the pressure roller for the counterpressure roller is formed by a dielectric.

4. The method according to claim 3, wherein the dielectric is selected from the group consisting of ceramics, glass, plastics, styrene-butadiene rubbers, chloroprene rubbers, butadiene rubbers, acrylonitrile-butadiene rubbers, butyl rubbers, ethylene-propylene-diene rubbers, polyisoprene rubbers, and silicone.

5. The method according to claim 2, the plasma is produced between the pressure roller, the counterpressure roller, and one nozzle or a plurality of nozzles.

6. The method according to claim 1, wherein the fluoropolymer web is formed from fluoropolymers comprising at least one of PTFE (polytetrafluoroethylene), ETFE (poly(ethylene-co-tetrafluoroethylene)), FEP (poly(tetrafluoroethylene-co-hexafluoropropylene)), PVDF (poly(1,1-difluoroethene), PFA (perfluoroalkoxy polymers), and mixtures of two or more of the above-mentioned fluoropolymers.

7. The method according to claim 6, wherein the fluoropolymers are mixed with one or more further polymers selected from the group consisting of homo- or copolymers of olefins, polypropylene homopolymers, and polypropylene copolymers including block (impact) and random polymers.

8. The method according to claim 6, wherein the fluoropolymers are mixed with one or more further polymers selected from the group consisting of, alone or in a mixture, polyesters, polyamide, polyurethane, polyoxymethylene polyvinylchloride, polyethylene naphthalate, ethylene vinyl alcohol, polyvinylidene chloride, polyvinylidene fluoride, polyacrylonitrile, polycarbonate, polyamide, sulfone, polyimide, polyarylene sulfide, and polyarylene oxide.

9. The method according to claim 1, further comprising:
traversing, with an arbitrary point, a path from the beginning of plasma treatment to the lamination gap in a time period of less than 2.0 s, wherein the arbitrary point is disposed on at least one of the first surface of the crosslinked silicone adhesive substance web treated with the plasma and the first surface of the fluoropolymer web treated with the plasma.

10. The method according to claim 9, wherein the time period is less than 0.5 s.

11. The method according to claim 1, wherein silicone of the crosslinked silicone adhesive substance web is thermally crosslinked or crosslinked by the action of moisture, electron beams, or UV irradiation.

12. The method according to as claimed in claim 1, wherein air, nitrogen, carbon dioxide, or a noble gas is used as a process gas for producing the plasma.

13. The method according to claim 1, wherein the layer thickness of the crosslinked silicone adhesive substance web is less than 100 µm.

14. The method according to claim 1, wherein entire surfaces of the two first surfaces are plasma-treated such that the plasma continuously acts on the two first surfaces beginning before the lamination gap and until the lamination gap is entered.

15. A method for producing an adhesive tape, the method comprising:
supplying a fluoropolymer web and a crosslinked silicone adhesive substance web to a lamination gap in the same supply direction such that a first surface of the crosslinked silicone adhesive substance web and a first surface of the fluoropolymer web are laminated together;

plasma treating the first surface of the fluoropolymer web and the first surface of the crosslinked silicone adhesive substance web with a plasma to activate the two first surfaces, wherein plasma treatment continuously acts on the two first surfaces, under atmospheric pressure, starting before the lamination gap until the lamination gap is entered; and pressing the activated two first surfaces onto one another in the lamination gap to produce a laminate that forms an adhesive tape having a pure fluoropolymer surface on a first side of the adhesive tape and a pure silicone adhesive substance surface on a second side of the adhesive tape opposite with respect to the first side of the adhesive tape such that the adhesive tape is glueable with the pure silicone adhesive substance surface to surfaces of parts to be joined.

16. The method according to claim 15, wherein the adhesive tape is a self-adhesive tape.

* * * * *